No. 742,925. PATENTED NOV. 3, 1903.
J. W. STOREY.
PLOW ATTACHMENT.
APPLICATION FILED AUG. 19, 1903.
NO MODEL.
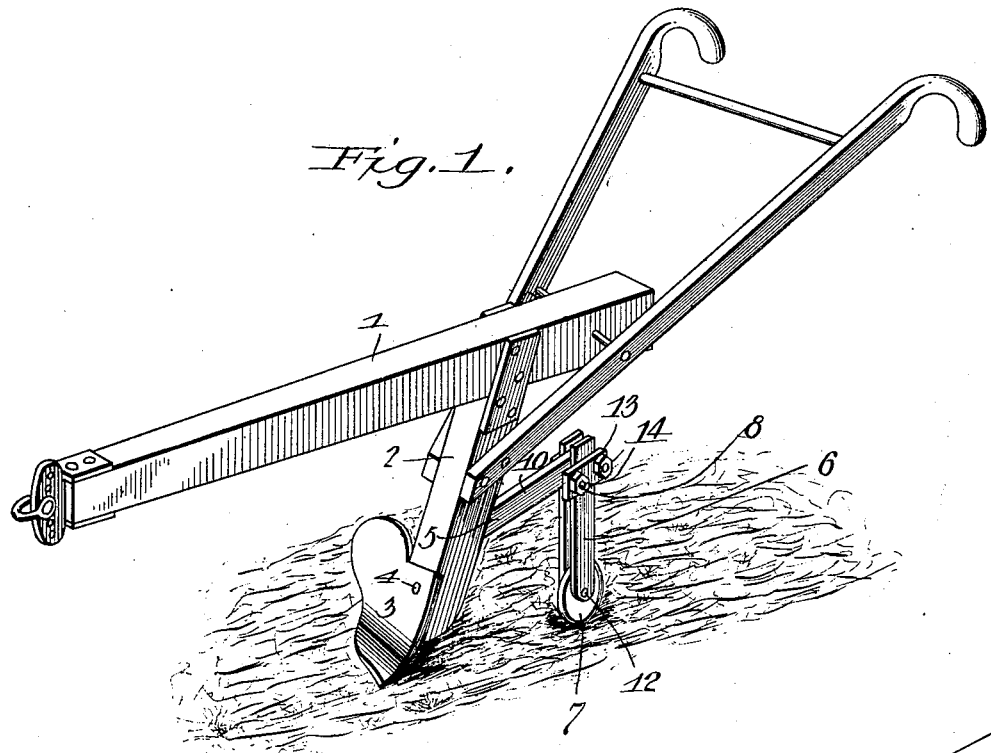
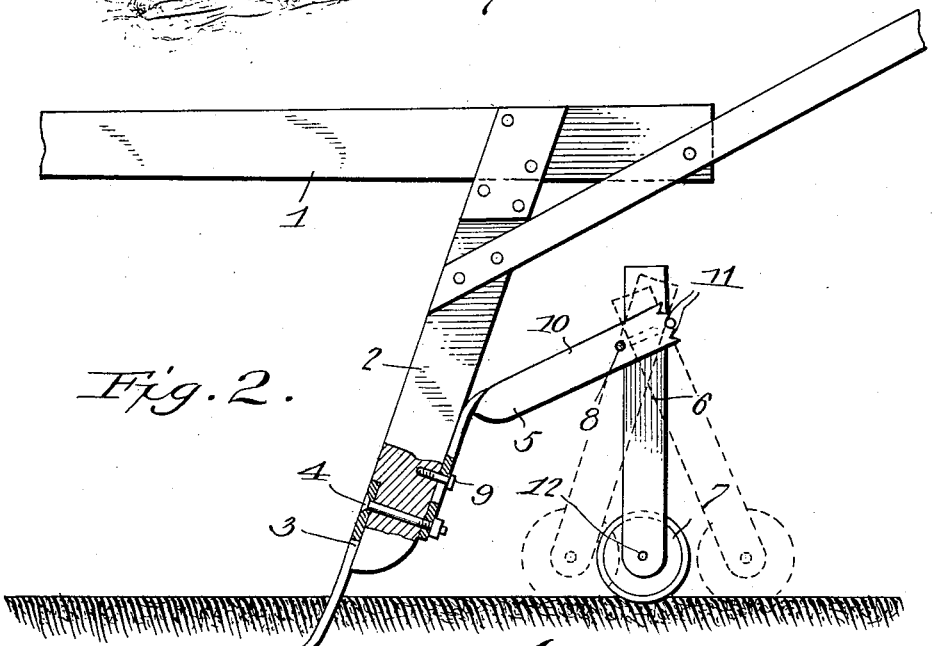
Witnesses
J. W. Storey, Inventor.
by C. A. Snow & Co.
Attorneys No. 742,925. Patented November 3, 1903.

UNITED STATES PATENT OFFICE.

JAMES WALTER STOREY, OF BEAUREGARD, MISSISSIPPI.

PLOW ATTACHMENT.

SPECIFICATION forming part of Letters Patent No. 742,925, dated November 3, 1903.

Application filed August 19, 1903. Serial No. 170,076. (No model.)

*To all whom it may concern:*

Be it known that I, JAMES WALTER STOREY, a citizen of the United States, residing at Beauregard, in the county of Copiah and State of Mississippi, have invented a new and useful Plow Attachment, of which the following is a specification.

My invention relates to plows, and especially to a slide attachment designed particularly for use in connection with shovel-plows, and has for its objects to produce a device of this character of simple construction which will be efficient in operation, one which will regulate the depth of entrance of the plow into and guide the same in its passage through the ground, and one which will obviate the plow jumping out of the ground upon meeting an obstruction.

To these ends the invention comprises the novel details of construction and combination of parts more fully hereinafter described.

In the accompanying drawings, Figure 1 is a perspective view of a plow provided with my improved attachment. Fig. 2 is a side sectional elevation of the same.

Referring to the drawings, 1 indicates a plow-beam provided adjacent to its rear end with a standard 2, to the lower end and upon the front face of which is attached the plow or shovel 3 by a horizontal bolt 4, extending transversely through the standard from front to rear. These parts may all be of the usual or any desired construction, inasmuch as they constitute no part of my invention.

My improved attachment comprises a primary member 5, a secondary member or members 6, sustaining a wheel or bearing device 7, and a coupling or attaching device 8 for securing the secondary to the primary member. The primary member 5 preferably consists of a suitable length of strap-iron provided adjacent to its lower end with a pair of perforations, one of which receives the rear end of bolt 4 and the other, which is in the form of a slot, receives a second bolt 9, which, in connection with the bolt 4, serves to firmly attach the member to the plow-standard. Immediately above its point of attachment to the standard the member is angularly bent and given a half-turn laterally, thus producing an angularly-disposed arm 10, projecting rearward from the standard and having its side faces disposed in a vertical plane, the terminal of said arm being notched or serrated to form teeth 11, the purpose of which will later appear.

There are preferably a pair of the members 6, each consisting of a suitable length of strap-iron rounded at its normally lower end. These members, which are of equal length, are disposed one on each side of the arm 10 and are spaced to receive between their lower ends the wheel or disk 7, mounted for rotation upon a horizontal bolt or axle 12, extending through and sustained by the members. The disk 7, which constitutes a bearing for the lower ends of the members in their travel over the ground, is preferably sharpened, so its peripheral edge will cut into and slightly enter the ground.

The attaching device 8 preferably consists of a U-shaped clip-bolt, one arm of which extends transversely through the primary member 5, while its other arm engages the teeth 11 at the end of the latter, the crown of the bolt being disposed longitudinally of arm 10. One of the members 6 is seated between the crown of the bolt and one side arm 10, while the companion member is disposed between the other side of the arm and a cross-strap 13, seated and held in position upon the arms of the bolt by nuts 14, tapped onto the ends of the latter. It is apparent from this construction that the members 6 may be readily adjusted vertically by loosening the nuts 14 and that their angular disposition relative to the member 5 may be varied, as indicated by dotted lines in Fig. 2, by changing the outer arm of the bolt in its relative engagement with the teeth 11, the engagement of the bolt with the upper tooth serving to impart a backward inclination, and with the lower tooth a forward inclination, to the members, as will be readily understood.

In operation the disk or roller 7 will travel upon the ground and slightly cut into or enter the latter, thus serving to obviate lateral motion of the plow and to guide it in a straight line. It is also to be noted that the depth of entrance of the plow into the ground may be varied according to the vertical adjustment of the members 6 and that the plow will be prevented from jumping out of the ground upon meeting obstructions through the bracing and sustaining action of the members, as will be readily understood.

From the foregoing it will be seen that I produce a device of simple construction which in practice will efficiently perform its functions to the attainment of the ends in view; but it is to be understood that I do not limit myself to the precise details herein set forth, inasmuch as minor changes may be made therein without departing from the spirit of the invention.

Having thus described my invention, what I claim is—

1. The combination with a plow and its standard, of a primary member carried by the latter, a pair of secondary members disposed one on each side of the primary member, means for attaching the secondary to the primary member, and a guiding-disk journaled for rotation between the secondary members.

2. The combination with a plow and its standard, of a primary member carried by the latter, a pair of vertically-adjustable secondary members disposed one on each side of the primary member, means for securing the secondary to the primary member, and a guiding-disk journaled for rotation between the secondary members.

3. The combination with a plow and its standard, of a primary member carried by the latter, teeth provided upon said member, a secondary member carrying a guiding device, and means for attaching the secondary to the primary member, said means comprising a clip-bolt having one arm engaging the teeth.

In testimony that I claim the foregoing as my own I have hereto affixed my signature in the presence of two witnesses.

JAMES WALTER STOREY.

Witnesses:
J. M. FLIPPIN,
JOE REYNOLDS.